(12) United States Patent
Henry

(10) Patent No.: US 9,373,155 B2
(45) Date of Patent: Jun. 21, 2016

(54) SEARCH RESULTS WITH STRUCTURED IMAGE SIZES

(71) Applicant: Google Inc., Mountain View, CA (US)

(72) Inventor: Jeromy William Henry, Aptos, CA (US)

(73) Assignee: Google Inc., Mountain View, CA (US)

( * ) Notice: Subject to any disclaimer, the term of this patent is extended or adjusted under 35 U.S.C. 154(b) by 351 days.

(21) Appl. No.: 13/967,793

(22) Filed: Aug. 15, 2013

(65) Prior Publication Data

US 2015/0161764 A1 Jun. 11, 2015

Related U.S. Application Data

(60) Provisional application No. 61/781,173, filed on Mar. 14, 2013, provisional application No. 61/684,428, filed on Aug. 17, 2012.

(51) Int. Cl.
*G06T 3/40* (2006.01)
*G06T 7/00* (2006.01)
*G06T 11/60* (2006.01)

(52) U.S. Cl.
CPC .................. *G06T 3/40* (2013.01); *G06T 7/0024* (2013.01); *G06T 11/60* (2013.01); *G06T 2207/20132* (2013.01)

(58) Field of Classification Search
CPC ......... G06T 3/4007; G06T 3/40; G06T 11/60; G06T 2207/20132; G06T 7/0024
See application file for complete search history.

(56) References Cited

U.S. PATENT DOCUMENTS

| | | | |
|---|---|---|---|
| 8,484,187 B1 | 7/2013 | Hong et al. | |
| 8,548,990 B2 | 10/2013 | Bennett et al. | |
| 8,583,637 B2 | 11/2013 | Berkner et al. | |
| 8,782,551 B1 * | 7/2014 | Bartelma | 715/776 |
| 2008/0155426 A1 | 6/2008 | Robertson et al. | |
| 2010/0073398 A1 * | 3/2010 | Fisher | G06F 17/30899 345/619 |
| 2012/0076414 A1 * | 3/2012 | Xu | G06F 17/30244 382/176 |
| 2013/0077853 A1 | 3/2013 | Chauvier et al. | |

* cited by examiner

*Primary Examiner* — Matthew Salvucci
(74) *Attorney, Agent, or Firm* — Fish & Richardson P.C.

(57) ABSTRACT

Methods, systems, and apparatus, including computer programs encoded on a computer storage medium, for generating search results with structured image sizes. According to one exemplary implementation, a process includes the operations of determining an initial height and an initial width of an image that is associated with a search result, wherein the image is to be displayed in the search result in line with text associated with the search result, and wherein the search result includes an in-line image region for displaying the image in line with the text, and a text region for displaying the text, and determining an initial height of the text region of the search result based at least on (i) the text associated with the search result, and (ii) an initial width of the text region. The process also includes outputting the scaled image for display in the search result in line with the text.

24 Claims, 11 Drawing Sheets

SEARCH RESULTS WITH STRUCTURED IMAGE SIZES

CROSS-REFERENCE TO RELATED APPLICATIONS

This application claims the benefit of U.S. Provisional Application Ser. No. 61/781,173, filed on Mar. 14, 2013 and U.S. Provisional Application Ser. No. 61/684,428, filed on Aug. 17, 2012, which are incorporated by reference.

BACKGROUND

This specification generally relates to search engines and, according to one particular implementation, to formatting search results that include images.

A user can submit a search query to a search engine. The search query can include, for example, one or more keywords. The search engine can access an indexed cache to identify a set of resources which satisfy the search query. For example, an identified resource can include a keyword that is included in the search query. The search engine can generate one or more search results pages which each include a set of search results, where each search result includes information associated with an identified resource, such as a title, a description, one or more URLs (Uniform Resource Locators), and metadata. One or more of the search results pages can be provided to the user in response to the search query.

SUMMARY

In general, one innovative aspect of the subject matter described in this specification can be embodied in methods that include the action of iteratively re-sizing an image region of a search result based on the amount of text in an in-line text region, and based on the effect that re-sizing the image region has on the in-line text region. For instance, an image region width can be calculated based on the height of the text in the text region, the height of the image, and the aspect ratio of the image. When the image region is resized to match the image region width, the height of the text is recalculated, which results in the recalculation of the image region width. Such recalculation continues until a predetermined maximum number of iterations occurs, until additional calculations have no further effect on region sizes or shapes, or until maximum or minimum region sizes are reached. In the event that a visually pleasing imaging region size or shape cannot be determined using this method, a default image region size may be used.

In general, one innovative aspect of the subject matter described in this specification can be embodied in a process that includes determining an initial height and an initial width of an image that is associated with a search result, wherein the image is to be displayed in the search result in line with text associated with the search result, and wherein the search result includes an in-line image region for displaying the image in line with the text, and a text region for displaying the text, determining an initial height of the text region of the search result based at least on (i) the text associated with the search result, and (ii) an initial width of the text region, determining an initial width of the in-line image region of the search result based at least on (i) the initial height of the text region of the search result, (ii) the initial height of the image, and (iii) the initial width of the image, determining an adjusted height of the text region of the search result based at least on the initial width of the in-line image region of the search result, determining an adjusted width of the in-line image region of the search result based at least on the adjusted height of the text region of the search result, determining an adjusted height and an adjusted width of the image based at least on the adjusted width of the in-line image region of the search result, scaling at least a portion of the image based at least on the adjusted height and the adjusted width of the image, and outputting the scaled image for display in the search result in line with the text.

Other embodiments of this aspect include corresponding systems, apparatus, and computer programs, configured to perform the actions of the methods, encoded on computer storage devices.

These and other embodiments can each optionally include one or more of the following features. For instance, the process includes determining that the initial width of the in-line image region exceeds a maximum in-line image region width, where the adjusted height of the text region is further based on the maximum in-line image region width; determining an adjusted width of the in-line image region includes determining that the initial width of the in-line image region is equal to or greater than the maximum in-line image region width, determining that the adjusted height of the text region of the search result is equal to or greater than the initial height of the text region of the search result, and outputting the maximum in-line image region width as the adjusted width of the in-line image region; determining an adjusted height and an adjusted width of the image includes determining that the adjusted height of the text region is outside of a predetermined range of the adjusted height of the image region, and outputting a default height and a default width as the adjusted height and the adjusted width of the image, respectively; determining an adjusted height and an adjusted width of the image includes determining that the adjusted height of the text region is within a predetermined range of the adjusted height of the image region, and outputting the adjusted height and the adjusted width of the image region as the adjusted height and the adjusted width of the image, respectively; the initial height of the text region is the same as the adjusted height of the text region; the process includes, after determining the adjusted width of the in-line image region of the search result, determining a further-adjusted width of the in-line image region of the search result based at least on (i) the adjusted height of the text region of the search result, (ii) the initial height of the image, and (iii) the initial width of the image, determining a further-adjusted height of the text region of the search result based at least on the further-adjusted width of the in-line image region of the search result, determining a further-further-adjusted width of the in-line image region of the search result based at least on the further-adjusted height of the text region of the search result, and determining a further-adjusted height and further-adjusted width of the image based at least on the further-further-adjusted width of the in-line image region of the search result, where the at least a portion of the image are scaled to the further-adjusted height and further-adjusted width; and/or the process includes cropping the image based on the adjusted width of the in-line image region.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

In general, a search result includes a text region for displaying text associated with the search result and an in-line image region for displaying an image, a video, a map, or other graphic object, or group thereof, associated with the search result in-line with the text. An estimation or determination can be made as to the height (e.g., number of lines) of the text, and a width of the in-line image region can be determined based on the determined text height. If a determination is made that the determined width of the in-line image region affects the text height estimate, the text height can be re-estimated, followed by a re-estimation of the in-line image width. Further such iterations can occur until a predefined number of iterations is reached or until some other stopping condition is reached, such as the text height being within a predetermined range of the height of the in-line image region. A height and width of the image can be determined based on the width of the in-line image region, and the image can be output for display in the search result line with the text.

Figure 1A:
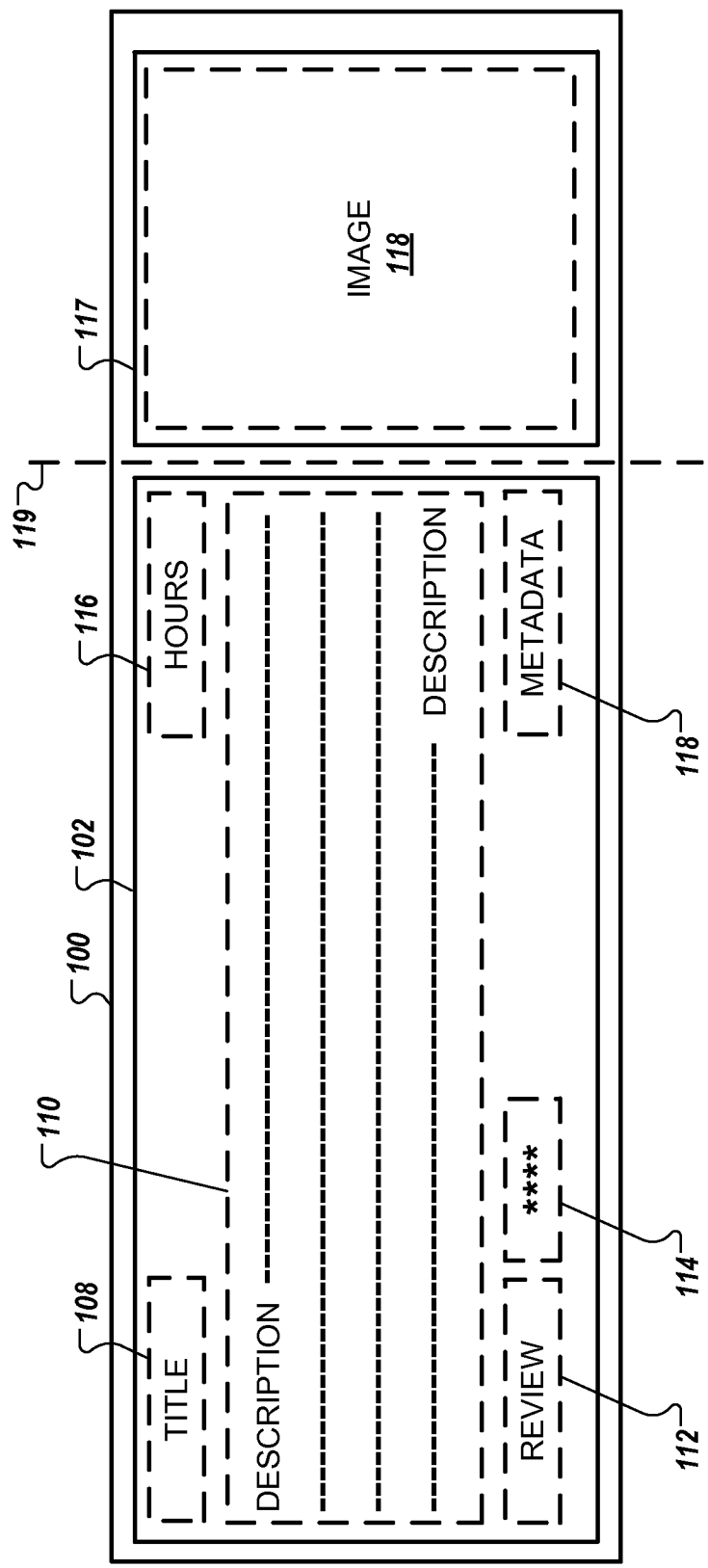
FIGS. 1A-1D illustrate exemplary search results.

FIG. 1A illustrates an exemplary search result 100. The search result 100 can be, for example, a search result provided by a search engine in response executing to a search query. The search result 100 includes a text region 102 for displaying text and other search result elements. The text region 102 can include a variety of types of search result elements, such as a title 108 and a description 110. Other examples of search result elements include a review 112, a rating 114, hours information 116, and other metadata 118. The text region 102 can also include various user interface controls, such as links or buttons. The text region 102 can also include a URL of a resource represented by the search result, notes, site links (e.g., links associated with the resource, history (e.g., information indicating when a user last visited the resource), address information, and stock quote information, to name a few examples.

Although FIG. 1A illustrates an exemplary search result 100, in other implementations other types of regions that include both text and one or more image regions can be adjusted using the illustrated process. For example, the illustrated process can be used to adjust the size of a panel, on a search results page or other page, that provides answers to questions.

The description 110 can be derived, for example, from one or more meta elements in the resource, can be extracted from the resource, or can be derived from some other resource, such as a directory. If the description 110 is extracted from the resource, the description 110 can include one or more sections of content from the resource that include one or more keywords used in the search query. The description 110 can be referred to as a "snippet". In some implementations, a snippet can refer to the set of all search result elements included in the text region 102 (e.g., the description 110 and other search result elements).

The search result 100 includes an in-line image region 117 for displaying an image (e.g., an image 118) that is associated with the search result 100. The in-line image region 117 can be to the right of the text region 102, as shown, or can be to the left of the text region 102. In either case, the text region 102 and the in-line image region 117 can be displayed in separate sections of the search result 100, as illustrated by a border line 119. The border line 119 is included here for illustration purposes and is not generally included or displayed in the search result 100.

Some or all of the search result elements included in the text region 102 can be of varying size (e.g., varying length). An initial height (e.g., number of lines) of the text region 102 can be determined, based, for example, on the content of the various search result elements included in the text region 102 and on an initial width of the text region 102. The image 118 can be of various sizes, and can have various aspect ratios. The size (e.g., height and width) of the image 118 and/or the width of the text region 102 can be adjusted so as to avoid unsightly whitespace areas in the search result 100.

Figure 1B:
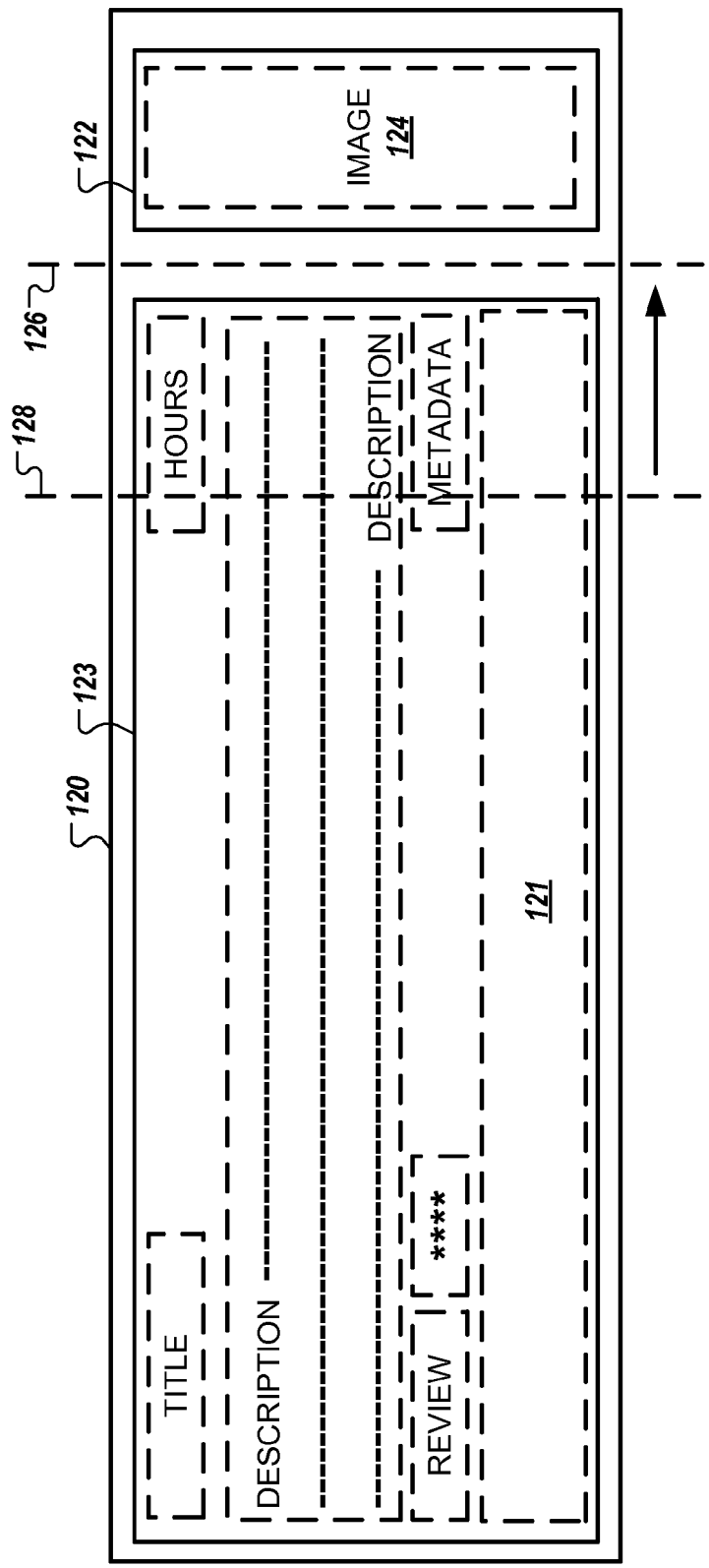

FIG. 1B illustrates an exemplary search result 120 which includes an undesired whitespace area 121. The search result 120 includes an in-line image region 122 and a text region 123. The in-line image region 122 includes an image 124, where the image 124 is "tall" (e.g., narrow). The image 124 having a small width (e.g., as compared to the image 118 of FIG. 1A) can result, for example, in the in-line image region 122 having a smaller width than the in-line image region 117 and the text region 123 having a larger width than the text region 102. That is, the width of the text region 123 can be "stretched", or extended to the right, as compared to the text region 102, as illustrated by a movement of a border 126 rightward from a border 128 (e.g., the border 128 corresponding to the border 119 of FIG. 1A).

The "stretching" of the text region 123 can result in the content of the text region 123 occupying less lines of text (e.g., as compared to the text region 102). The text region 123 occupying less lines of text can result in the creation of the undesired whitespace area 121. The existence of the whitespace area 121 can be unsightly to a user. Also, a search results page can include multiple search results, and multiple displayed search results can include a whitespace area such as the whitespace area 121, resulting in an unsightly search results page which does not make efficient use of space.

Figure 1C:
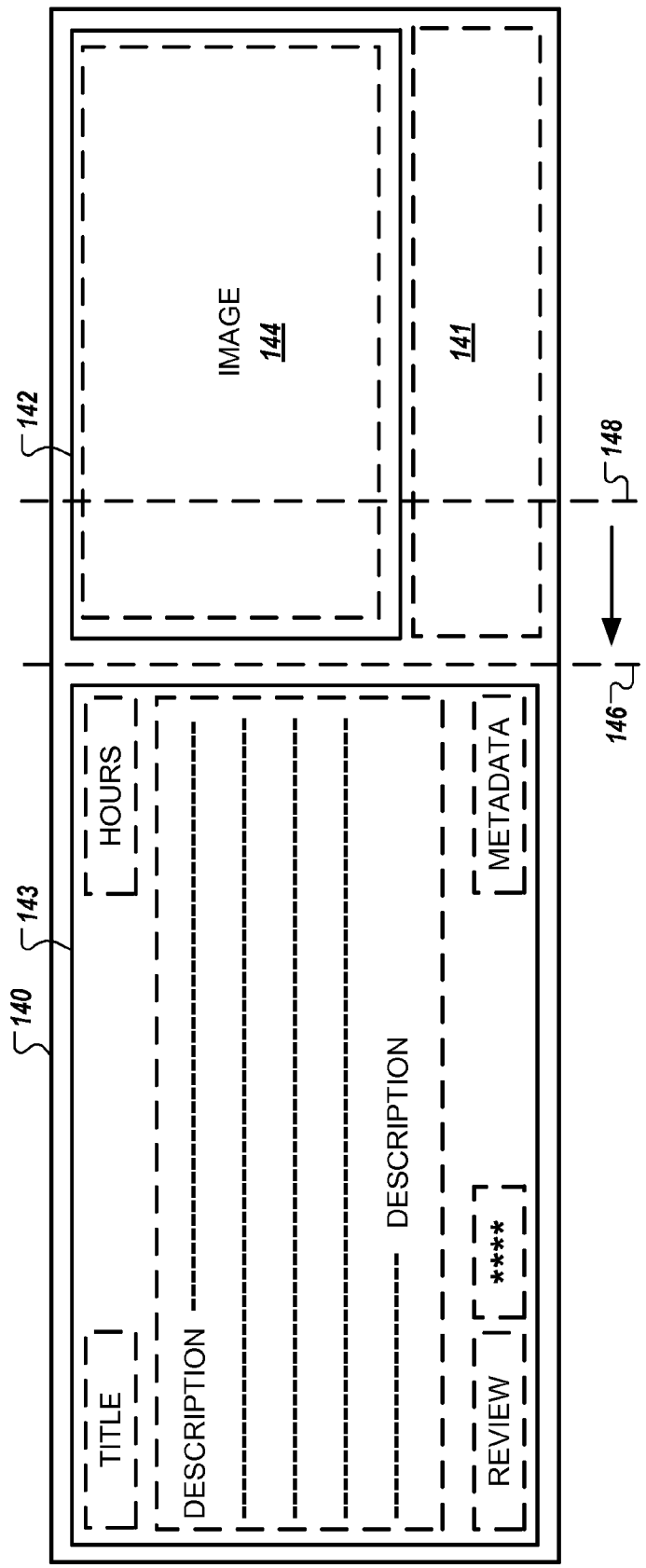

FIG. 1C illustrates an exemplary search result 140 which includes a whitespace area 141. The search result 140 includes an in-line image region 142 and a text region 143. The in-line image region 142 includes an image 144, where the image 144 is relatively wide (e.g., as compared to the image 118 of FIG. 1A). The image 144 having a wide width can result, for example, in the in-line image region 142 having a larger width than the in-line image region 117 and the text region 143 having a smaller width than the text region 102. That is, the width of the text region 143 can be "shrunk", or "pushed" to the left, as compared to the text region 102, as illustrated by a movement of a border 146 leftward from a border 148 (e.g., the border 148 corresponding to the border 119 of FIG. 1A).

The compacting of the text region 143 can result in the content of the text region 143 occupying more lines of text (e.g., as compared to the text region 102). The text region 143 occupying more lines of text can result in the creation of the undesired whitespace area 141. Similar to the whitespace area 121, the existence of the whitespace area 141 can be unsightly to a user and wasteful of space, if present in the search result 140 and in other similar search results on a search results page.

Figure 1D:
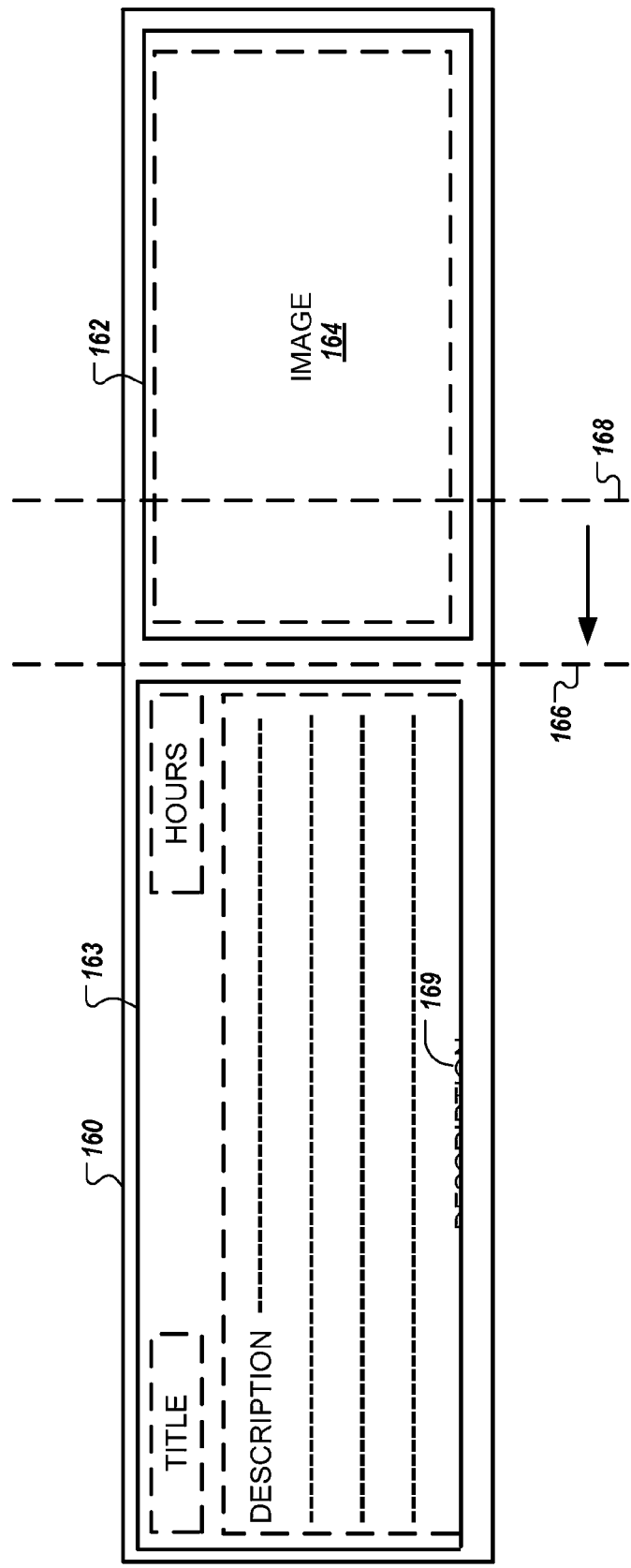

FIG. 1D illustrates another exemplary search result 160. The search result 160 includes an in-line image region 162 and a text region 163. Similar to the in-line image region 142, the in-line image region 162 includes a "wide" image 164, which can result, for example, in the in-line image region 162 having a larger width than the in-line image region 117 and the text region 163 having a smaller width than the text region 102. That is, the width of the text region 163 can be "shrunk", or "pushed" to the left, as compared to the text region 102, as illustrated by a movement of a border 166 leftward from a border 168 (e.g., the border 168 corresponding to the border 119 of FIG. 1A).

In the search result 160, rather than allow the height of the text region 163 to expand below the bottom of the in-line image region 162, the contents of the text region are cropped, as illustrated by partial text 169. Such a cropping approach avoids an undesired whitespace area such as the whitespace area 141 of FIG. 1C, but has a disadvantage of the partial or complete removal of content from the search result 160 (e.g., search control elements such as the review 112, the rating 114, and the metadata 118 included in the search result 100 are not visible in the search result 160). A cropping approach can also be used to crop the image 164 to avoid whitespace areas, but such an approach has a disadvantage of removal of a portion of the image 164. As described in more detail below, an approach can be used to align the bottom of the in-line image region 162 with the bottom of the text region 163, while maintaining the aspect ratio of the image 164 and the width of the search result 160, and without cropping or removal of content from the text region 163 or the image 164.

If the search result 160 is associated with additional images, the additional images can be iteratively processed using the illustrated process, or the images can be clustered and processed as a single, aggregated image.

Figure 2:
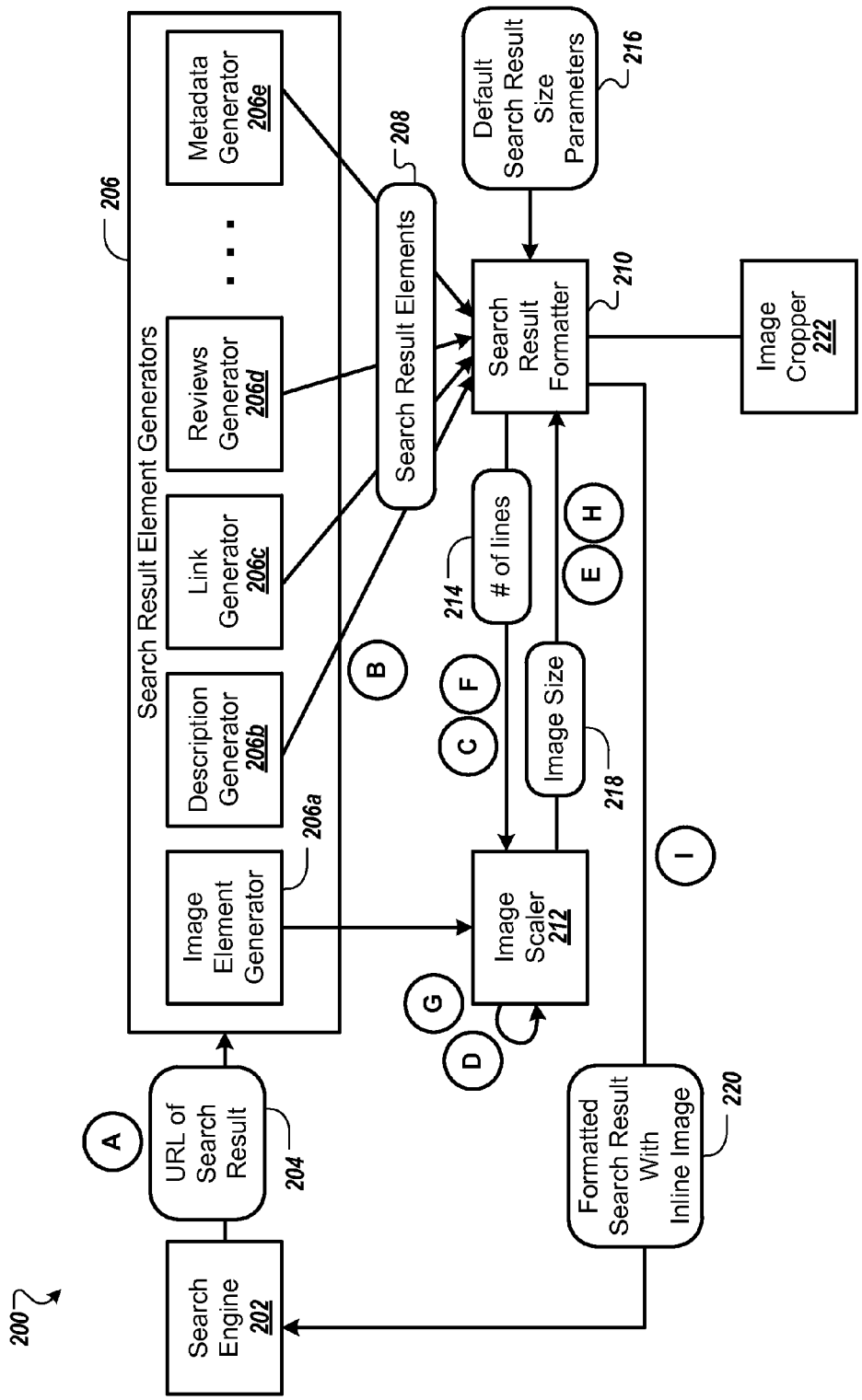
FIG. 2 illustrates an exemplary system.

FIG. 2 illustrates an exemplary system 200. In a first stage "A", a search engine 202 provides a URL 204 of a search result to a set of search result element generators 206. The search engine 202 can identify the search result in response to a search query.

In a stage "B", search result element generators 206b-206e provide one or more search result elements 208 to a search result formatter 210. For example, a description generator 206b can generate a description (e.g., the description 110) of the search result, a link generator 206c can generate one or more links to be included in the search result, a review generator 206d can generate review-related content (e.g., the review 112) to be included in the search result, and a metadata generator 206e can generate one or more metadata items (e.g., the hours 116, the metadata 118) to include in the search result. Also in stage "B", an image element generator 206a generates an image element to be included in the search result and provides the image element to an image scaler 212.

In a stage "C", the search result formatter 210 provides a number-of-lines estimate 214 to the image scaler 212. The number-of-lines estimate 214 is an estimate of the number of lines that will be occupied by the search result elements 208 in a text region of the search result, based on default search result size parameters 216, such as an initial width of the text region.

In a stage "D", the image scaler 212 scales the width of the image element based at least on the number-of-lines estimate 214, the initial height of the image element, and the initial width of the image element. For example, if the number-of-lines estimate 214 is five lines, a corresponding pixel height of the text region can be determined to be, for example, eighty pixels (e.g., using an estimate of 16 pixels per line). The image scaler 212 can scale the height of the image element to be eighty pixels and can determine a scaled width of the image element while maintaining the aspect ratio of the image element.

In a stage "E", the scaled height and width of the image element are provided to the search result formatter 210 as an adjusted image size 218. An adjusted width of the image element can result in an adjusted width of the text region (e.g., if the image element is wider, the amount of the search result width allocated to the text region can be reduced).

In a stage "F", the search result formatter 210 can provide an updated number-of-lines estimate (e.g., as the number-of-lines estimate 214) based on the adjusted text region width. For example, the search result formatter can determine that the search result elements 208 may occupy seven lines of text in a text region having the adjusted text region width.

In a stage "G", the image scaler 212 further scales the width of the image element based at least on the adjusted number-of-lines estimate, the adjusted height of the image element, and the adjusted width of the image element. In a stage "H", the image scaler provides adjusted image size information to the search result formatter 210.

Further similar exchanges between the search result formatter 210 and the image scaler 212 may take place. For example, such exchanges can occur until a predefined number of iterations is reached or until some other stopping condition is reached, such as the height of the text region being within a predetermined range of the height of the image element. In a stage "I", the search result formatter 210 provides a formatted search result 220 that includes a scaled image to the search engine 202. In some implementations, the image may be cropped using an image cropper 222. The search engine 202 can provide the formatted search result 220 to a user, such as in a search results page provided in response to a search query.

Figure 3:
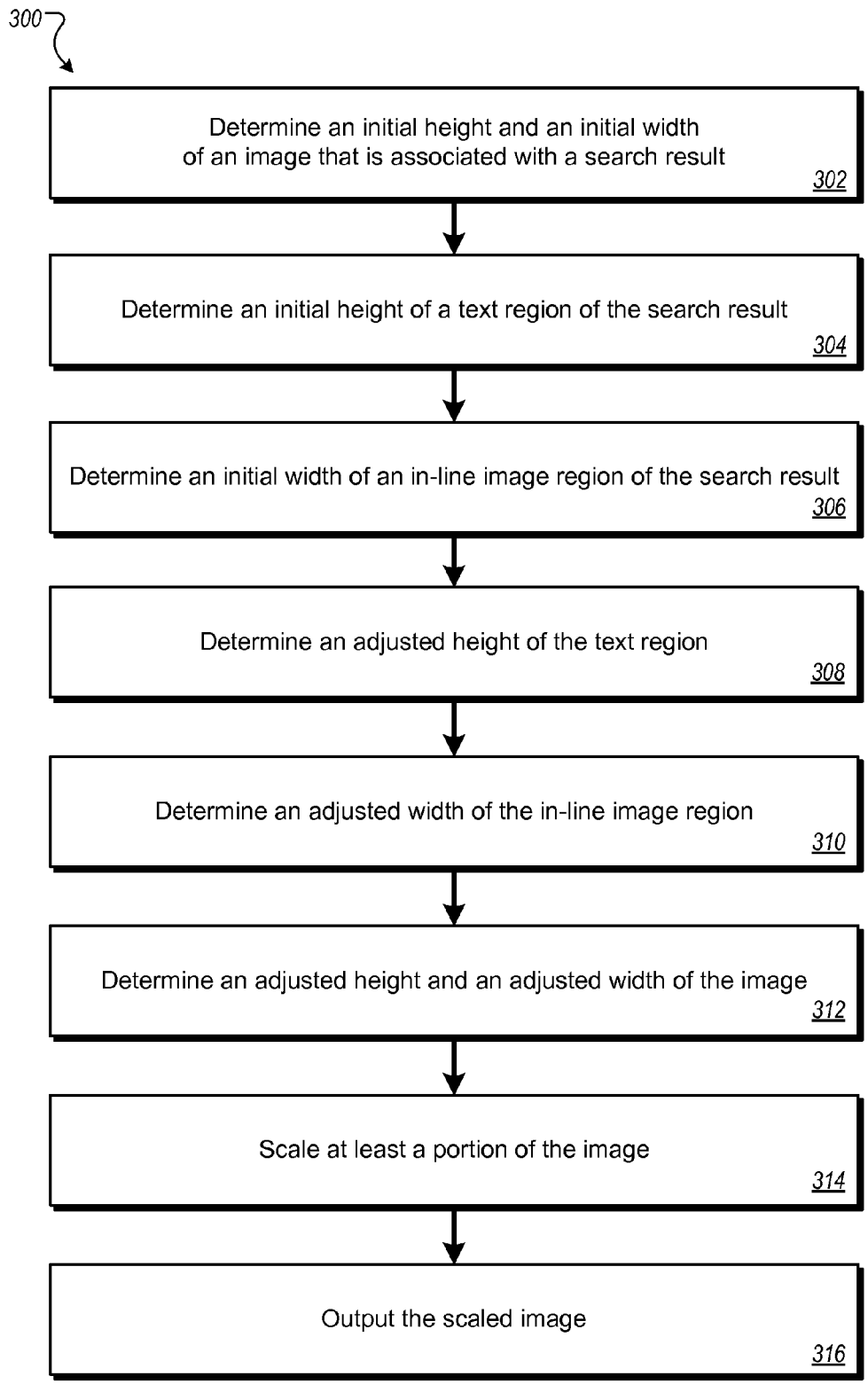
FIGS. 3-8 illustrate exemplary computer-implemented processes.

FIG. 3 is a flowchart illustrating a computer-implemented process 300 for adjusting a content region. The content region may be, for example, a search result, a region of a search result page that includes answers or that summarizes subjects, topics, or entities, or a page or portion of a page that is generated by a search system and that provides an answer to a question.

When the process 300 begins, an initial height and an initial width of an image that is associated with a search result, or of a group of images, are determined (302), where the image is to be displayed in the search result in line with text associated with the search result, and where the search result includes an in-line image region for displaying the image in line with the text, and a text region for displaying the text. In other implementations that include other media types, such as videos or maps, the dimensions associated with those other media types are determined. Where the search result is associated with more than one search result, the process 300 can iteratively evaluate or process each image, or the images can be grouped into a multi-image cluster that is evaluated as a whole.

The text associated with the search result can include a title and a description of the search result. Other examples of textual elements include a review, a rating, hours information, a URL of a resource represented by the search result, notes, site links, history information indicating when a user last visited the resource, address information, and stock quote information. In some implementations, the text region can include elements other than text (e.g., user interface controls). The image associated with the search result can be, for example, an image included in or otherwise associated with the resource represented by the search result. As a more particular example, the image can be an image of an author of the resource.

An initial height of the text region of the search result is determined based at least on (i) the text associated with the search result, and (ii) an initial width of the text region (304). For example, the search result can have a predetermined width, and the initial width of the text region can be a predetermined portion of the search result width (with the remaining portion of the search result defining a default in-line image region width). The initial height of the text region can be determined, for example, by determining how many lines the text associated with the search result occupies if included in the text region having the predetermined initial text-region width. A number of pixels for the initial height of the text region can be determined by multiplying the determined number of lines by a predetermined number of pixels per line estimate. For example, a determined number of lines may be five, a predetermined number of pixels per line estimate may be ten, and the initial height of the text region can be determined to be fifty pixels.

An initial width of the in-line image region of the search result is determined based at least on (i) the initial height of the text region of the search result, (ii) the initial height of the image, and (iii) the initial width of the image (306). For example, the width of the in-line image region can be scaled based on the initial height of the text region, and the initial height and width of the image. For example, if the initial height of the text region is fifty pixels, the initial height of the image is one hundred pixels, and the initial width of the image is two hundred pixels, the initial width of the in-line image region can be determined to be (50/100*200) or a width of one hundred pixels.

An adjusted height of the text region of the search result is determined based at least on the initial width of the in-line image region of the search result (308). The height of the text region can be adjusted, for example, based on the text region occupying more or less of the search result in consideration of how the initial width of the text region is affected by the determined initial width of the in-line region. For example, if the determined in-line image region width is less than the default in-line image region width, the text region may be "stretched" (e.g., occupy more of the search result width) and may therefore occupy less lines of text (e.g., resulting in an adjusted text region height that is less than the initial text region height). As another example, if the determined in-line image region width is more than the default in-line image region width, the text region may be "squished" (e.g., occupy less of the search result width) and may therefore occupy more lines of text (e.g., resulting in text wrapping which results in an adjusted text region height that is more than the initial text region height).

In some implementations, a determination can be made that the initial width of the in-line image region exceeds a maximum in-line image region width. After such a determination, the adjusted height of the text region can be further based on the maximum in-line image region width. For example, the initial width of the in-line image region can be set to the maximum in-line image region width. The adjusted height of the text region can be determined based on how many lines the text of the search result occupies in a text region that has a width determined based on the search result including an in-line image region having the maximum in-line image region width.

An adjusted width of the in-line image region of the search result is determined based at least on the adjusted height of the text region of the search result (310). For example, the width of the in-line image region can be scaled based on the adjusted height of the text region, and the initial height and width of the image.

An adjusted height and an adjusted width of the image are determined based at least on the adjusted width of the in-line image region of the search result (312). For example, the adjusted width of the image can be set to the adjusted width of the in-line image region and the adjusted height of the image can be scaled based on the adjusted width of the image.

At least a portion of the image is scaled based at least on the adjusted height and the adjusted width of the image (314). In some implementations, the image is cropped based on the adjusted width of the in-line image region.

If other images are associated with the search result, those images are iteratively processed to fit in a remaining space of the search result, until no further images or space is available. The scaled image or images are outputted for display in the search result in line with the text (316).

Figure 4:
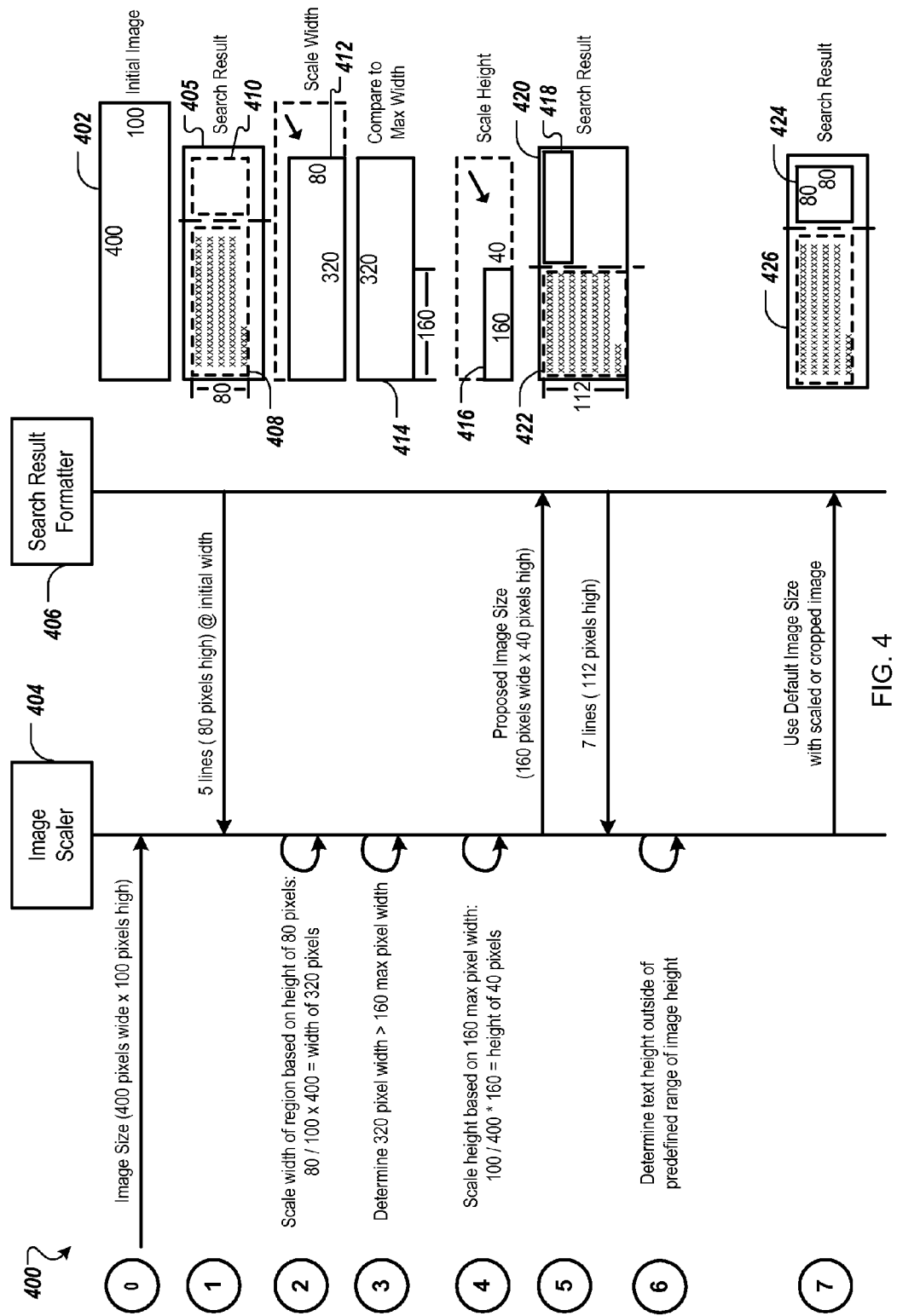

FIG. 4 is a flowchart illustrating an exemplary computer-implemented process 400 for adjusting a search result. In a stage "0", a size of an initial image 402 (e.g., four hundred pixels wide by one hundred pixels high) associated with a search result is provided to an image scaler 404. In this example, the image 402 is four times wider than it is tall.

In a stage "1" and as illustrated in an example search result 405, a search result formatter 406 determines that an initial height of a text region 408 of the search result 405 is five lines (or a corresponding eighty pixels) high, given an initial width of the text region 408. The initial width of the text region 408 can be determined, for example, based on the overall width of the search result 405 and a default in-line image region width (e.g., a default in-line image region width of 80 pixels, as illustrated by a default image 410).

In a stage "2", the image scaler 404 scales the width of the in-line image region based on the text-region height of eighty pixels and on the size of the initial image 402. For example, as illustrated in a scaled image 412, given a scaled image height of eighty pixels, an initial image height of one hundred pixels, and an initial image width of four hundred pixels, the image scaler 404 can determine a scaled image width of three hundred twenty pixels.

In a stage "3" and as illustrated in a scaled image 414, the image scaler 404 determines that the width of the scaled image 414 of three hundred twenty pixels is greater than a predetermined maximum image width of one hundred sixty pixels.

In a stage "4" and as illustrated in a scaled image 416, the image scaler 404 scales the height of the image 402 based on a scaled image width equal to the maximum image width of one hundred sixty pixels. For example, given an initial image height of one hundred pixels, an initial image width of four hundred pixels, and a scaled image width of one hundred sixty pixels, the image scaler 404 can determine a scaled image height of forty pixels.

In a stage "5", a proposed image size of one hundred sixty pixels by forty pixels is provided to the search result formatter 406, as illustrated by a scaled image 418 included in a search result 420. The search result formatter 406 determines that an adjusted height of a text region 422 of the search result 420 is seven lines (or a corresponding one hundred twelve pixels), based on a text region width that results from the proposed image size. The adjusted text region height is provided to the image scaler 404.

In a stage "6", the image scaler 404 determines that the adjusted text region height is outside of a predetermined range of the height of the image 418. For example, the image scaler 404 can compare a text height to image height ratio (e.g., one hundred twelve to forty, or a value of 2.8) to a threshold ratio (e.g., a threshold of 2.5). In response to determining that the text height to image height ratio is more than a threshold, the image scaler 404 can determine that the image 418 simply "won't fit", or is too wide to be included in the search result 420 while maintaining the aspect ratio of the image 418 and having a height that is within a predefined range of the height of the text region 422.

In a stage "7", a selected image size of a default image height (e.g., eighty pixels) and a default image width (e.g., eighty pixels) is provided to the search result formatter 406, as illustrated by an image 424 included in a search result 426. The image 424 may be a scaled image and/or a cropped image (e.g., the image scaler 404 may scale the image 402 to have the default image height and width, and/or the image 402 may be cropped to fit the default image height and width).

Figure 5:
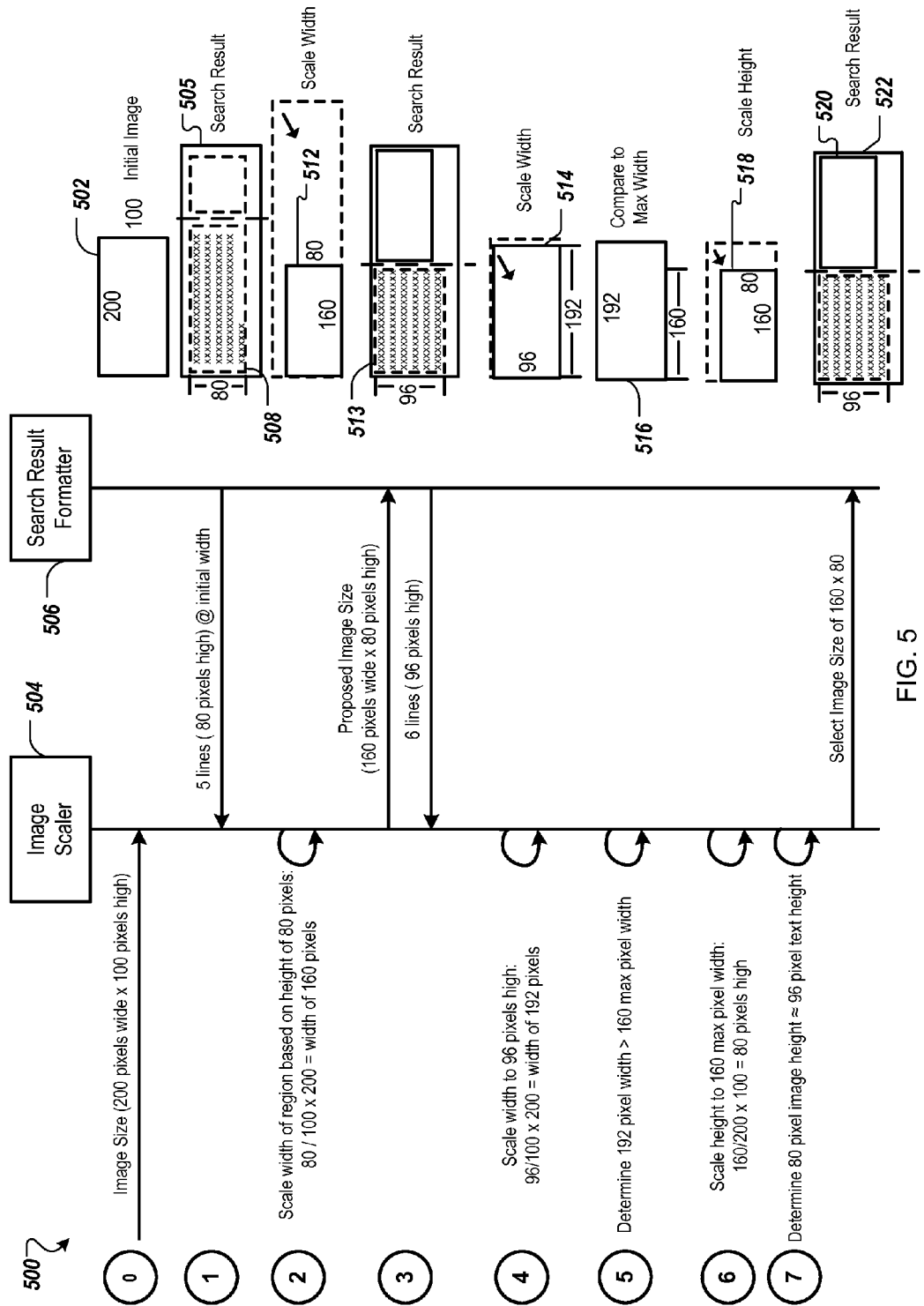

FIG. 5 is a flowchart illustrating an exemplary computer-implemented process 500 for adjusting a search result. In a stage "0", the size of an image 502 (e.g., two hundred pixels wide by one hundred pixels high) associated with a search result is provided to an image scaler 504. In this example, the image 502 is twice as wide as it is tall.

In a stage "1" and as illustrated in a search result 505, a search result formatter 506 determines that an initial height of a text region 508 of the search result 505 is five lines (or a corresponding eighty pixels) high, given an initial width of the text region 508.

In a stage "2" and as illustrated in a scaled image 512, the image scaler 504 scales the width of an in-line image region based on the text-region height of eighty pixels. For example, given a scaled image height of eighty pixels, an initial image height of one hundred pixels, and an initial image width of two hundred pixels, the image scaler 504 can determine a scaled image width of one hundred sixty pixels.

In a stage "3", a proposed image size of one hundred sixty pixels by eighty pixels is provided to the search result formatter 506. The search result formatter 506 determines that an adjusted height of the text region 508 is six lines (or a corresponding ninety six pixels), as illustrated by a text region 513 and based on a text region width that results from the proposed image size. The adjusted text region height is provided to the image scaler 504.

In a stage "4" and as illustrated in a scaled image 514, the image scaler 504 scales the width of the image 502 based on the adjusted text-region height of ninety six pixels. For example, given a scaled image height of ninety six pixels, an initial image height of one hundred pixels, and an initial image width of two hundred pixels, the image scaler 504 can determine a scaled image width of one hundred ninety two pixels.

In a stage "5" and as illustrated in a scaled image 516, the image scaler 504 determines that the width of the scaled image 516 of one hundred ninety two pixels is greater than a predetermined maximum image width of one hundred sixty pixels.

In a stage "6" and as illustrated in a scaled image 518, the image scaler 504 scales the height of the image 502 based on the maximum image width of one hundred sixty pixels. For example, given the maximum image width of one hundred sixty pixels, an initial image height of one hundred pixels, and an initial image width of two hundred pixels, the image scaler 504 can determine a scaled image height of eighty pixels.

In a stage 7, the image scaler 504 determines that an 80 pixel image height is within a predetermined range (e.g., 82%, sixteen pixels) of a ninety six pixel text region height. A selected image size of one hundred sixty pixels by eighty pixels is provided to the search result formatter 506, as illustrated by a scaled image 520 included in a search result 522.

Figure 6:
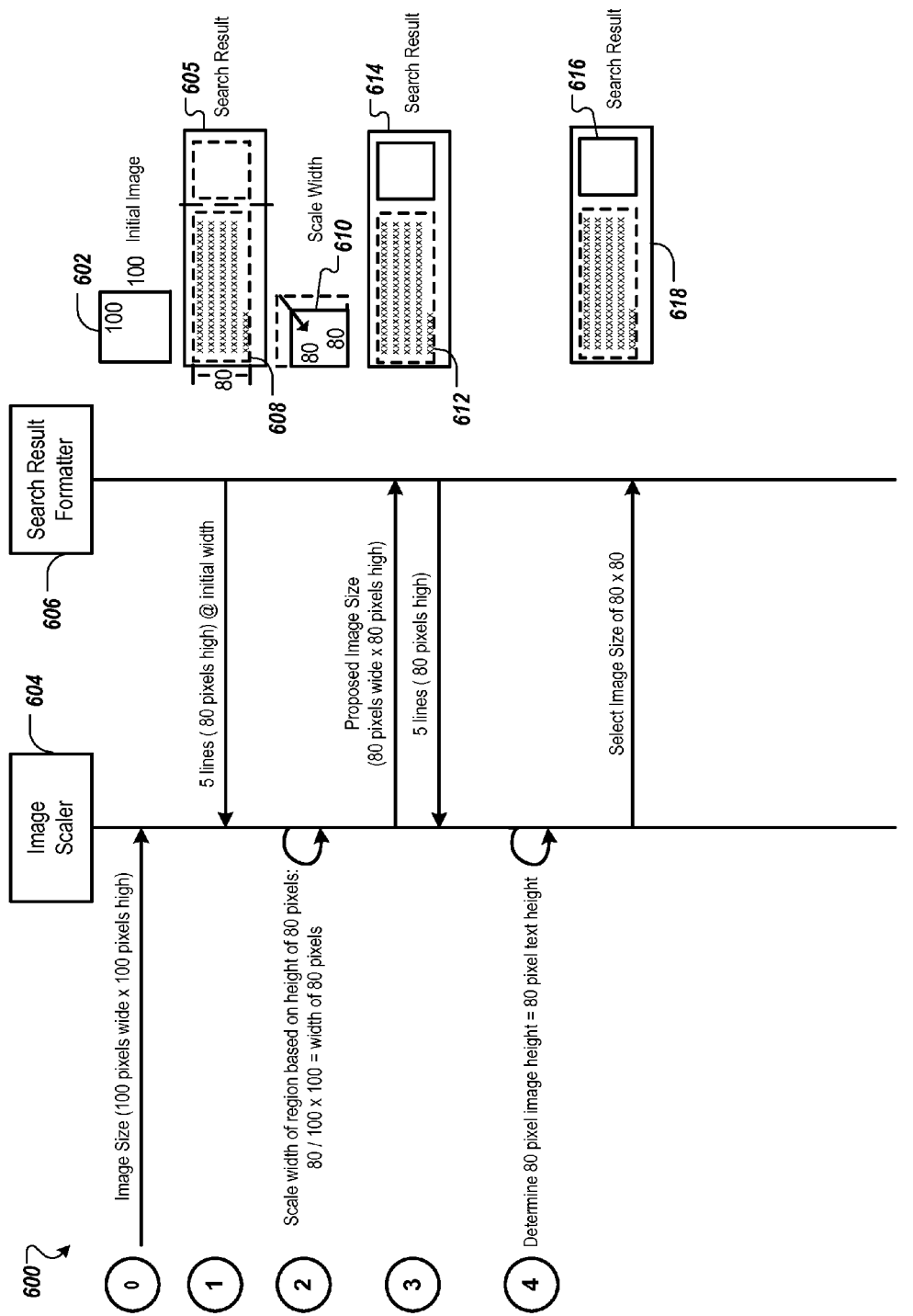

FIG. 6 is a flowchart illustrating an exemplary computer-implemented process 600 for adjusting a search result. In a stage "0", the size of an image 602 (e.g., one hundred pixels wide by one hundred pixels high) associated with a search result is provided to an image scaler 604. In this example, the image 602 is a square image.

In a stage "1" and as illustrated in a search result 605, a search result formatter 606 determines that an initial height of a text region 608 of the search result 605 is five lines (or a corresponding eighty pixels) high, given an initial width of the text region 608.

In a stage "2" and as illustrated in a scaled image 610, the image scaler 604 scales the width of an in-line image region based on the text-region height of eighty pixels. For example, given a scaled image height of eighty pixels, an initial image height of one hundred pixels, and an initial image width of one hundred pixels, the image scaler 604 can determine a scaled image width of eighty pixels.

In a stage "3", a proposed image size of eighty pixels by eighty pixels is provided to the search result formatter 606. The search result formatter 606 determines that an adjusted height of the text region 608 is the same as the previously determined text region height (e.g., five lines, or eighty pixels), as illustrated by a text region 612 included in a search result 614. The adjusted text region height is provided to the image scaler 604.

In a stage "4", the image scaler 604 determines that the previously proposed image height of eighty pixels is equal to the adjusted text region height of eighty pixels. A selected image size of one eighty pixels by eighty pixels is provided to the search result formatter 606, as illustrated by a scaled image 616 included in a search result 618.

Figure 7:
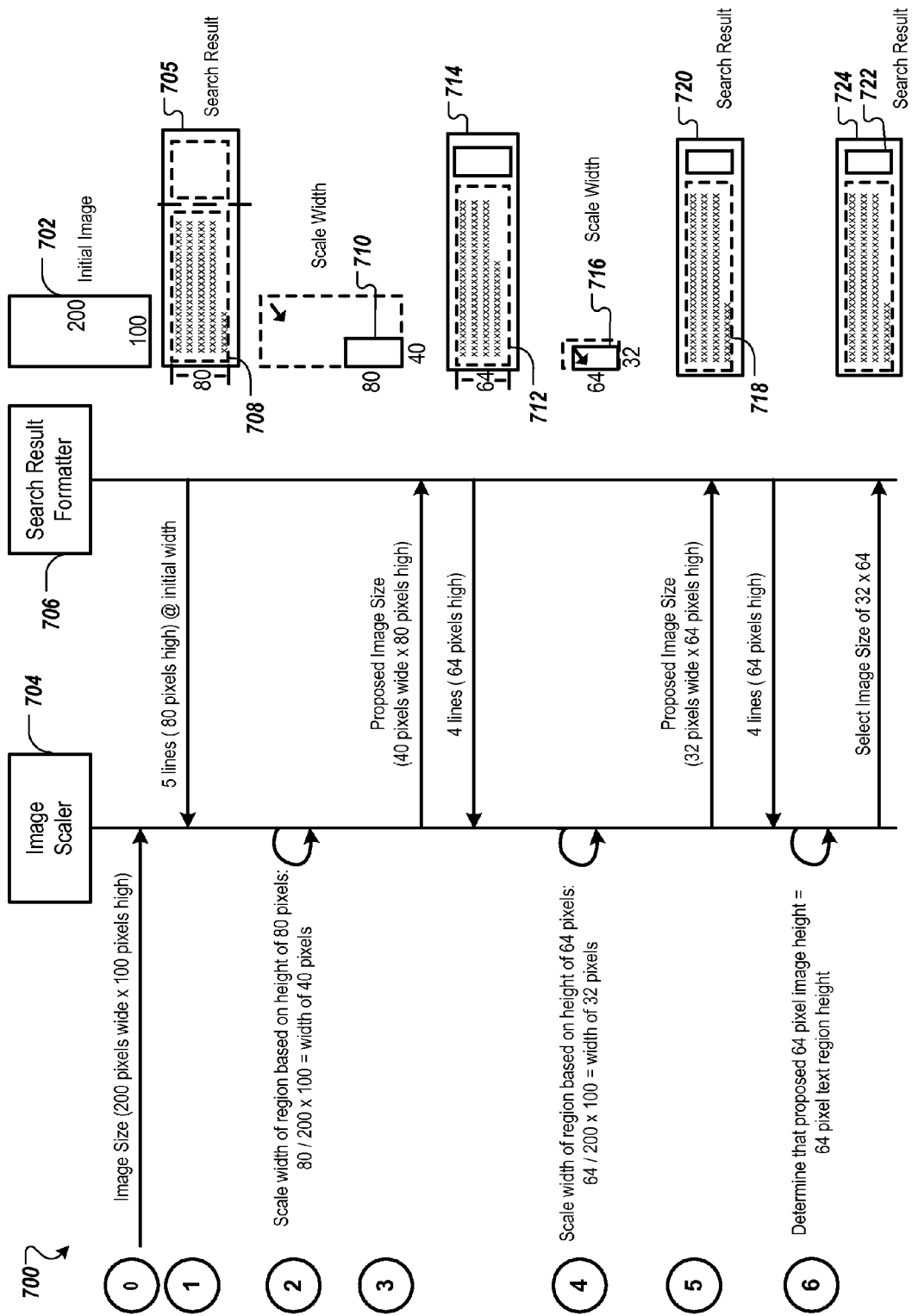

FIG. 7 is a flowchart illustrating an exemplary computer-implemented process 700 for adjusting a search result. In a stage "0", the size of an image 702 (e.g., one hundred pixels wide by two hundred pixels high) associated with a search result is provided to an image scaler 704. In this example, the image 702 is twice as tall as it is wide.

In a stage "1" and as illustrated in a search result 705, a search result formatter 706 determines that an initial height of a text region 708 of the search result 705 is five lines (or a corresponding eighty pixels) high, given an initial width of the text region 708.

In a stage "2" and as illustrated in a scaled image 710, the image scaler 704 scales the width of an in-line image region based on the text-region height of eighty pixels. For example, given a scaled image height of eighty pixels, an initial image height of two hundred pixels, and an initial image width of one hundred pixels, the image scaler 704 can determine a scaled image width of forty pixels.

In a stage "3", a proposed image size of forty pixels by eighty pixels is provided to the search result formatter 706. The search result formatter 706 determines that an adjusted height of the text region 708 is four lines (or a corresponding sixty four pixels), as illustrated by a text region 712 included in a search result 714 and based on a text region width that results from the proposed image size. The adjusted text region height is provided to the image scaler 704.

In a stage "4" and as illustrated in a scaled image 716, the image scaler 704 scales the width of the in-line image region based on the text-region height of sixty four pixels. For example, given a scaled image height of sixty four pixels, an initial image height of two hundred pixels, and an initial image width of one hundred pixels, the image scaler 704 can determine a scaled image width of thirty two pixels.

In a stage "5", a proposed image size of thirty two pixels by sixty four pixels is provided to the search result formatter 706. The search result formatter 706 determines that an adjusted height of the text region 712 is the same as the previously determined text region height (e.g., four lines, or sixty four pixels), as illustrated by a text region 718 included in a search result 720. The adjusted text region height is provided to the image scaler 604.

In a stage "6", the image scaler 704 determines that the previously proposed image height of sixty four pixels is equal to the adjusted text region height of sixty four pixels. A selected image size of thirty two pixels by sixty four pixels is provided to the search result formatter 706, as illustrated by a scaled image 722 included in a search result 724.

Figure 8:
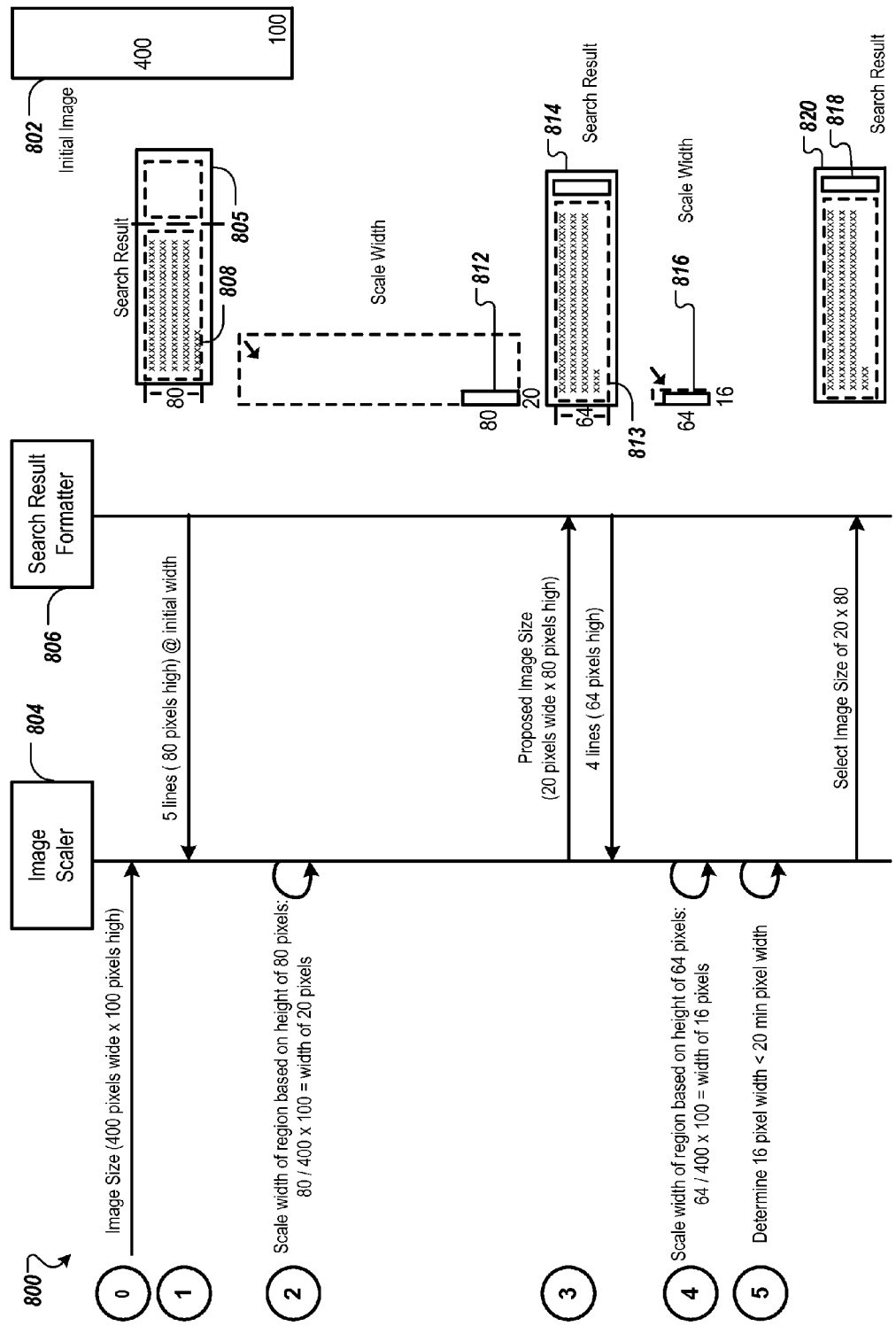

FIG. 8 is a flowchart illustrating an exemplary computer-implemented process 800 for adjusting a search result. In a stage "0", the size of an image 802 (e.g., one hundred pixels wide by four hundred pixels high) associated with a search result is provided to an image scaler 804. In this example, the image 802 is four times as tall as it is wide.

In a stage "1" and as illustrated in a search result 805, a search result formatter 806 determines that an initial height of a text region 808 of the search result 805 is five lines (or a corresponding eighty pixels) high, given an initial width of the text region 808.

In a stage "2" and as illustrated in a scaled image 812, the image scaler 804 scales the width of an in-line image region based on the text-region height of eighty pixels. For example, given a scaled image height of eighty pixels, an initial image height of four hundred pixels, and an initial image width of one hundred pixels, the image scaler 804 can determine a scaled image width of twenty pixels.

In a stage "3", a proposed image size of twenty pixels by eighty pixels is provided to the search result formatter 806. The search result formatter 806 determines that an adjusted height of the text region 808 is four lines (or a corresponding sixty four pixels), as illustrated by a text region 813 included in a search result 814 and based on a text region width that results from the proposed image size. The adjusted text region height is provided to the image scaler 804.

In a stage "4" and as illustrated in a scaled image 816, the image scaler 804 scales the width of the image 802 based on the adjusted text-region height of sixty four pixels. For example, given a scaled image height of sixty four pixels, an initial image height of four hundred pixels, and an initial image width of one hundred pixels, the image scaler 804 can determine a scaled image width of sixteen pixels.

In a stage "5", the image scaler 804 determines that a sixteen pixel image width is less than a minimum pixel width of twenty pixels. As a result of the determination, the image scaler 804 can select the previously proposed image size as a selected image size. A selected image size of twenty pixels by eighty pixels is provided to the search result formatter 806, as illustrated by an image 818 included in a search result 820.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A computer-implemented method comprising:
    determining an initial height and an initial width of an image that is associated with a search result, wherein the image is to be displayed in the search result in line with text associated with the search result, and wherein the search result includes an in-line image region for displaying the image in line with the text, and a text region for displaying the text;
    determining an initial height of the text region of the search result based at least on (i) the text associated with the search result, and (ii) an initial width of the text region;
    determining an initial width of the in-line image region of the search result based at least on (i) the initial height of the text region of the search result, (ii) the initial height of the image, and (iii) the initial width of the image;
    determining that a) space in the in-line image region or space in the text region will include undesired whitespace, or b) text associated with the search result and for presentation in the search result will be removed from the text region; and
    in response to determining that a) space in the in-line image region or space in the text region will include undesired whitespace, or b) text associated with the search result and for presentation in the search result will be removed from the text region:
        determining an adjusted height of the text region of the search result based at least on the initial width of the in-line image region of the search result;
        determining an adjusted width of the in-line image region of the search result based at least on the adjusted height of the text region of the search result;
        determining an adjusted height and an adjusted width of the image based at least on the adjusted width of the in-line image region of the search result;
        scaling at least a portion of the image based at least on the adjusted height and the adjusted width of the image; and
        outputting the scaled image for display in the search result in line with the text.

2. The method of claim 1, comprising:
    determining that the initial width of the in-line image region exceeds a maximum in-line image region width, wherein the adjusted height of the text region is further based on the maximum in-line image region width.

3. The method of claim 1, wherein determining an adjusted width of the in-line image region comprises:
    determining that the initial width of the in-line image region is equal to or greater than a maximum in-line image region width;
    determining that the adjusted height of the text region of the search result is equal to or greater than the initial height of the text region of the search result; and
    outputting the maximum in-line image region width as the adjusted width of the in-line image region.

4. The method of claim 1, wherein determining an adjusted height and an adjusted width of the image comprises:
    determining that the adjusted height of the text region is outside of a predetermined range of the adjusted height of the image region; and
    outputting a default height and a default width as the adjusted height and the adjusted width of the image, respectively.

5. The method of claim 1, wherein determining an adjusted height and an adjusted width of the image comprises:
    determining that the adjusted height of the text region is within a predetermined range of the adjusted height of the image region; and
    outputting the adjusted height and the adjusted width of the image region as the adjusted height and the adjusted width of the image, respectively.

6. The method of claim 1, wherein the initial height of the text region is the same as the adjusted height of the text region.

7. The method of claim 1, comprising, after determining the adjusted width of the in-line image region of the search result:
   determining a further-adjusted width of the in-line image region of the search result based at least on (i) the adjusted height of the text region of the search result, (ii) the initial height of the image, and (iii) the initial width of the image;
   determining a further-adjusted height of the text region of the search result based at least on the further-adjusted width of the in-line image region of the search result;
   determining a further-further-adjusted width of the in-line image region of the search result based at least on the further-adjusted height of the text region of the search result; and
   determining a further-adjusted height and further-adjusted width of the image based at least on the further-further-adjusted width of the in-line image region of the search result,
   wherein the at least a portion of the image are scaled to the further-adjusted height and further-adjusted width.

8. The method of claim 1, comprising cropping the image based on the adjusted width of the in-line image region.

9. A system comprising:
   one or more computers and one or more storage devices storing instructions that are operable, when executed by the one or more computers, to cause the one or more computers to perform operations comprising:
      determining an initial height and an initial width of an image that is associated with a search result, wherein the image is to be displayed in the search result in line with text associated with the search result, and wherein the search result includes an in-line image region for displaying the image in line with the text, and a text region for displaying the text;
      determining an initial height of the text region of the search result based at least on (i) the text associated with the search result, and (ii) an initial width of the text region;
      determining an initial width of the in-line image region of the search result based at least on (i) the initial height of the text region of the search result, (ii) the initial height of the image, and (iii) the initial width of the image;
      determining that a) space in the in-line image region or space in the text region will include undesired whitespace, or b) text associated with the search result and for presentation in the search result will be removed from the text region; and
      in response to determining that a) space in the in-line image region or space in the text region will include undesired whitespace, or b) text associated with the search result and for presentation in the search result will be removed from the text region:
         determining an adjusted height of the text region of the search result based at least on the initial width of the in-line image region of the search result;
         determining an adjusted width of the in-line image region of the search result based at least on the adjusted height of the text region of the search result;
         determining an adjusted height and an adjusted width of the image based at least on the adjusted width of the in-line image region of the search result;
         scaling at least a portion of the image based at least on the adjusted height and the adjusted width of the image; and
         outputting the scaled image for display in the search result in line with the text.

10. The system of claim 9, wherein the operations comprise:
   determining that the initial width of the in-line image region exceeds a maximum in-line image region width, wherein the adjusted height of the text region is further based on the maximum in-line image region width.

11. The system of claim 9, wherein determining an adjusted width of the in-line image region comprises:
   determining that the initial width of the in-line image region is equal to or greater than a maximum in-line image region width;
   determining that the adjusted height of the text region of the search result is equal to or greater than the initial height of the text region of the search result; and
   outputting the maximum in-line image region width as the adjusted width of the in-line image region.

12. The system of claim 9, wherein determining an adjusted height and an adjusted width of the image comprises:
   determining that the adjusted height of the text region is outside of a predetermined range of the adjusted height of the image region; and
   outputting a default height and a default width as the adjusted height and the adjusted width of the image, respectively.

13. The system of claim 9, wherein determining an adjusted height and an adjusted width of the image comprises:
   determining that the adjusted height of the text region is within a predetermined range of the adjusted height of the image region; and
   outputting the adjusted height and the adjusted width of the image region as the adjusted height and the adjusted width of the image, respectively.

14. The system of claim 9, wherein the initial height of the text region is the same as the adjusted height of the text region.

15. The system of claim 9, wherein the operations comprise, after determining the adjusted width of the in-line image region of the search result:
   determining a further-adjusted width of the in-line image region of the search result based at least on (i) the adjusted height of the text region of the search result, (ii) the initial height of the image, and (iii) the initial width of the image;
   determining a further-adjusted height of the text region of the search result based at least on the further-adjusted width of the in-line image region of the search result;
   determining a further-further-adjusted width of the in-line image region of the search result based at least on the further-adjusted height of the text region of the search result; and
   determining a further-adjusted height and further-adjusted width of the image based at least on the further-further-adjusted width of the in-line image region of the search result,
   wherein the at least a portion of the image are scaled to the further-adjusted height and further-adjusted width.

16. The system of claim 9, wherein the operations comprise cropping the image based on the adjusted width of the in-line image region.

17. A non-transitory computer-readable medium storing software comprising instructions executable by one or more computers which, upon such execution, cause the one or more computers to perform operations comprising:

determining an initial height and an initial width of an image that is associated with a search result, wherein the image is to be displayed in the search result in line with text associated with the search result, and wherein the search result includes an in-line image region for displaying the image in line with the text, and a text region for displaying the text;

determining an initial height of the text region of the search result based at least on (i) the text associated with the search result, and (ii) an initial width of the text region;

determining an initial width of the in-line image region of the search result based at least on (i) the initial height of the text region of the search result, (ii) the initial height of the image, and (iii) the initial width of the image;

determining that a) space in the in-line image region or space in the text region will include undesired whitespace, or b) text associated with the search result and for presentation in the search result will be removed from the text region; and in response to determining that a) space in the in-line image region or space in the text region will include undesired whitespace, or b) text associated with the search result and for presentation in the search result will be removed from the text region:

determining an adjusted height of the text region of the search result based at least on the initial width of the in-line image region of the search result;

determining an adjusted width of the in-line image region of the search result based at least on the adjusted height of the text region of the search result;

determining an adjusted height and an adjusted width of the image based at least on the adjusted width of the in-line image region of the search result;

scaling at least a portion of the image based at least on the adjusted height and the adjusted width of the image; and outputting the scaled image for display in the search result in line with the text.

18. The medium of claim 17, wherein the operations comprise:

determining that the initial width of the in-line image region exceeds a maximum in-line image region width, wherein the adjusted height of the text region is further based on the maximum in-line image region width.

19. The medium of claim 17, wherein determining an adjusted width of the in-line image region comprises:

determining that the initial width of the in-line image region is equal to or greater than a maximum in-line image region width;

determining that the adjusted height of the text region of the search result is equal to or greater than the initial height of the text region of the search result; and outputting the maximum in-line image region width as the adjusted width of the in-line image region.

20. The medium of claim 17, wherein determining an adjusted height and an adjusted width of the image comprises:

determining that the adjusted height of the text region is outside of a predetermined range of the adjusted height of the image region; and outputting a default height and a default width as the adjusted height and the adjusted width of the image, respectively.

21. The medium of claim 17, wherein determining an adjusted height and an adjusted width of the image comprises:

determining that the adjusted height of the text region is within a predetermined range of the adjusted height of the image region; and outputting the adjusted height and the adjusted width of the image region as the adjusted height and the adjusted width of the image, respectively.

22. The medium of claim 17, wherein the initial height of the text region is the same as the adjusted height of the text region.

23. The medium of claim 17, wherein the operations comprise, after determining the adjusted width of the in-line image region of the search result:

determining a further-adjusted width of the in-line image region of the search result based at least on (i) the adjusted height of the text region of the search result, (ii) the initial height of the image, and (iii) the initial width of the image;

determining a further-adjusted height of the text region of the search result based at least on the further-adjusted width of the in-line image region of the search result;

determining a further-further-adjusted width of the in-line image region of the search result based at least on the further-adjusted height of the text region of the search result; and determining a further-adjusted height and further-adjusted width of the image based at least on the further-further-adjusted width of the in-line image region of the search result, wherein the at least a portion of the image are scaled to the further-adjusted height and further-adjusted width.

24. The medium of claim 17, wherein the operations comprise cropping the image based on the adjusted width of the in-line image region.

* * * * *